Aug. 6, 1940.                H. G. CONRADE ET AL                2,209,947
       APPARATUS FOR DELIVERING MEASURED QUANTITIES OF LIQUID
              BY VOLUME FROM BOTTLES OR SIMILAR VESSELS
                    Filed Dec. 22, 1938           2 Sheets-Sheet 1

Inventors,
H. G. Conrade &
L. T. Payne
By: Glascock Downing & Seebold
Attys.

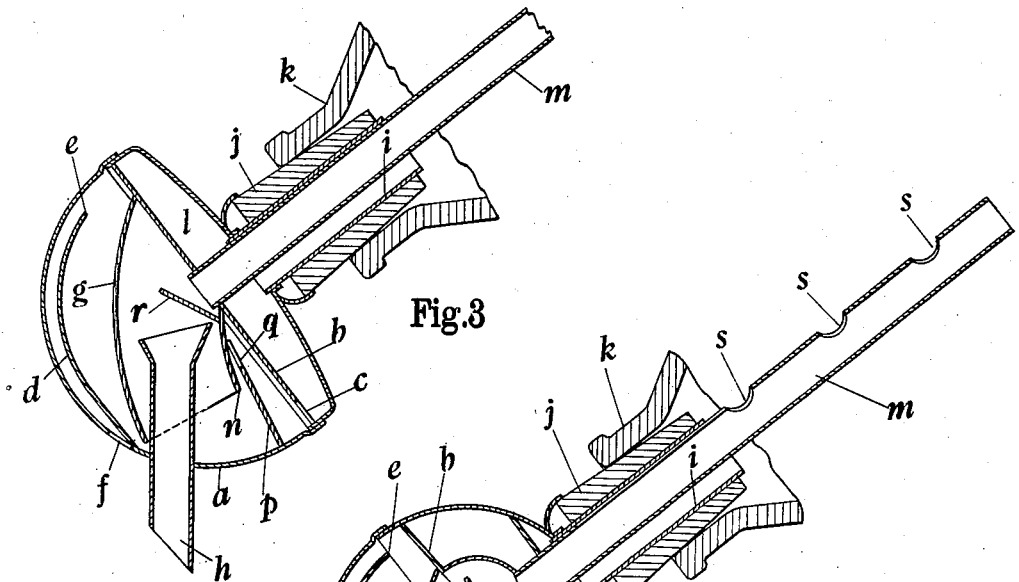

Patented Aug. 6, 1940

2,209,947

UNITED STATES PATENT OFFICE 2,209,947

APPARATUS FOR DELIVERING MEASURED QUANTITIES OF LIQUID BY VOLUME FROM BOTTLES OR SIMILAR VESSELS

Harold George Conrade and Lawrence Temple Payne, Birmingham, England

Application December 22, 1938, Serial No. 247,364
In Great Britain December 22, 1937

8 Claims. (Cl. 221—98)

This invention has for its object to provide improved apparatus for delivering measured quantities of liquid from bottles or other vessels, the apparatus being of the type consisting of a measuring chamber adapted to be attached to the vessel and provided with a syphon device, the measuring and the discharge of the required volume of liquid being effected by tilting the vessel so that liquid can pass from the latter to the measuring chamber and thence to a discharge outlet.

The invention comprises the combination of a measuring chamber having means for attaching it to the vessel, a plate bounding one side of the chamber and having an opening in the part which is lowermost when the apparatus is in a tilted service position for effecting a measuring operation, a syphon device arranged within the chamber, an air tube adapted to connect the syphon device with the vessel, and a supply duct communicating with the said opening for conducting liquid from the vessel to the lower part of the measuring chamber when the apparatus is in its tilted service position, and also for conducting all residual liquid back from the measuring chamber to the vessel when the apparatus is returned to an upright position.

In the accompanying sheets of explanatory drawings, Figures 1, 2, 3, 4 and 5 illustrate five different forms of measuring apparatus constructed in accordance with the invention, the apparatus in each figure being shown attached to the neck of a bottle and being represented in the tilted position.

Figure 1:
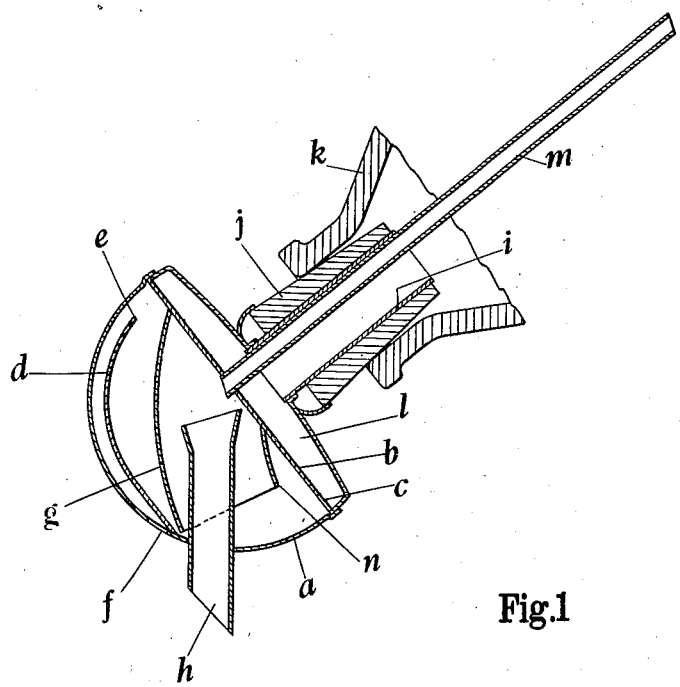

Referring to Figure 1, the apparatus comprises a hollow sheet metal or other body part $a$ of substantially hemispherical form. Within the body part is arranged a flat partition plate $b$ which extends across the body part and is provided with an opening at $c$. Also within the body part is arranged another and curved plate $d$ which has a free edge at $e$ and is situated closely adjacent to the front hemispherical wall of the body part. The latter is provided with an air inlet at $f$. The measuring chamber is formed by the region bounded by the plates $b$ and $d$. Air from the outer atmosphere has free access to this chamber through the aperture $f$ and the passage between the plate $d$ and the adjacent wall of the body part.

Within the measuring chamber is arranged the syphon. This comprises a tube $g$ having one end open and the other end attached to and closed by the plate $b$, and a discharge tube $h$ which passes through the open end of the tube $g$ and is carried by the body part $a$. One end of the tube $h$ is arranged to extend beyond the body part and serve as a spout, and the other end is preferably splayed outwardly to a funnel-like form as shown.

From the rear side of the body part extends a tube $i$ surrounded by a cork sleeve $j$ adapted to be inserted in the neck of the bottle $k$. One end of this tube opens into the bottle and the other end opens into the chamber $l$ formed by the plate $b$ and the rear of the body part $a$. Also an air tube $m$ is arranged to extend from the syphon through the tube $i$ to the interior of the bottle.

The tube $i$, chamber $l$ and aperture $c$ form the duct whereby (when the bottle and the attached measuring apparatus are tilted as shown in Figure 1) the liquid is conducted from the bottle to the measuring chamber. Also this duct serves to conduct all residual liquid back from the measuring chamber to the bottle when the latter is returned to an upright position. It is essential that this duct shall open into the lower part of the measuring chamber as shown.

When the bottle, with the attached measuring apparatus, is tilted as shown liquid can flow into the measuring apparatus to a height determined by the relative dispositions of the parts forming the syphon. On reaching the top of the discharge tube $h$ the syphon action sets in and causes the liquid in the measuring chamber to be discharged in the usual manner. The discharge ceases when the level of the liquid falls to the position occupied by the edge portion $n$ of the tube $g$.

Figure 2:
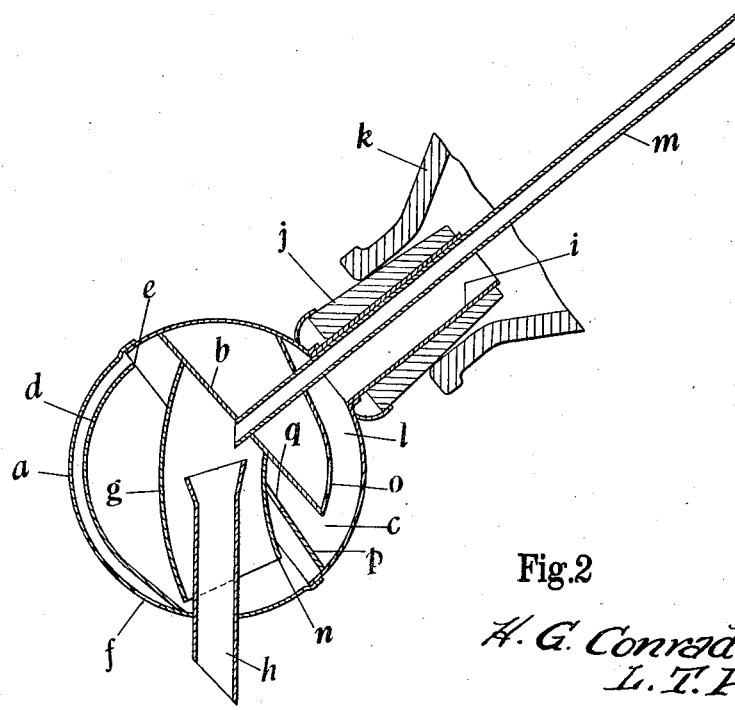

The construction shown in Figure 2 is essentially similar to that shown in Figure 1 and differs only in subordinate details. In this example the body $a$ is of spherical form, and in combination with the plate $b$ is arranged another plate $o$ which, with the adjacent wall of the body part forms the duct leading from the tube $i$ to the aperture $c$, the region between the plate $o$ and plate $b$ being a dead space. In addition we arrange adjacent to and in front of the aperture $c$ a weir plate $p$ over the upper free edge $q$ of which the liquid can flow into the lower part of the measuring chamber. The action of this modification is the same as the one first described. On discharge of the measuring chamber the liquid falls until its level reaches the point $n$ of the tube $g$, and during discharge the plate $p$ serves to hold back sufficient liquid in the supply duct to seal the aperture $c$.

The construction shown in Figure 3 is also essentially similar to that shown in Figure 1 and differs in that a weir plate $p$ is provided (as in Figure 2) in front of the opening $c$. Also a larger air tube is used, and a baffle $r$ is arranged to form a weir at the entrance to the air tube. The apparatus shown in Figure 3 is especially adapted for dealing with citrous and like fruit juices which contain cellular or pulpy substances, and as such cellular or pulpy substances find their way into the air tube, it is necessary to employ a comparatively large air tube to accommodate them without choking. When such a tube is used a baffle as $r$ over the entrance becomes desirable and in some cases may be necessary.

The construction shown in Figure 4 is essentially similar to that shown in Figure 2 in that it has a spherical body part. It also resembles the construction shown in Figure 3 in that it has a large air tube and a baffle $r$ at the entrance to the air tube. Also the portion of the plate $b$ forming the closed end of the syphon tube $g$ is made to a dome-like form. Moreover, openings $a$ are provided at intervals along the upper side of the air tube $m$, the purpose of these holes being to expedite the rate of filling of the measuring chamber and to enable the apparatus to give a succession of measures of liquid (even when the vessel is approaching depletion) without the need for returning the vessel to the vertical position between successive measures.

The construction shown in Figure 5 is essentially similar to that shown in Figure 4. It differs in that the tube $i$ is connected to the plate $b$ by a tube $t$. In this construction the tube $t$ and the part of the tube $m$ lying between the plate $b$ and the tube $i$ are exposed, but if desired these parts may be enclosed by the rear portion of the body part $a$, the latter being then made of spherical form as in Figures 2, 4 or 5.

The invention is not limited to the examples above described as subordinate constructional details may be varied to suit different requirements.

Having thus described our invention what we claim as new and desire to secure by Letters Patent is:

1. Apparatus of the type specified for delivering measured quantities of liquid from a bottle or other vessel, comprising the combination of a measuring chamber having means for attaching it to the vessel, a plate bounding one side of the chamber and having an opening in the part which is lowermost when the apparatus is in a tilted service position for effecting a measuring operation, a syphon device arranged within the chamber, an air tube adapted to connect the syphon device with the vessel, and a supply duct communicating at one end with the chamber through the said opening for conducting liquid from the vessel to the lower part of the chamber when the apparatus is in its tilted service position, the said end of the supply duct being situated at the lowermost part of the chamber when the apparatus is in an upright out-of-service position so that the supply duct can also serve for conducting all residual liquid back from the chamber to the vessel after a measuring operation.

2. Apparatus of the type specified for delivering measured quantities of liquid from a bottle or other vessel, comprising the combination of a measuring chamber having means for attaching it to the vessel, a plate bounding one side of the chamber and having an opening in the part which is lowermost when the apparatus is in a tilted service position for effecting a measuring operation, a syphon device arranged within the chamber, an air tube adapted to connect the syphon device with the vessel, a supply duct communicating with the chamber through the said opening for conducting liquid from the vessel to the lower part of the chamber when the apparatus is in its tilted service position, and also for conducting all residual liquid back from the chamber to the vessel when the apparatus is returned to an upright position, and a weir plate situated in front of the said opening and wholly within the lower part of the chamber when the apparatus is in its tilted service position.

3. Apparatus of the type specified for delivering measured quantities of liquid from a bottle or other vessel, comprising the combination of a measuring chamber having means for attaching it to the vessel, a plate bounding one side of the chamber and having an opening in the part which is lowermost when the apparatus is in a tilted service position for effecting a measuring operation, a syphon device arranged within the chamber, an air tube adapted to connect the syphon device with the vessel, a baffle plate arranged in the syphon device and forming a weir in front of the entrance to the air tube, and a supply duct communicating at one end with the chamber through the said opening for conducting liquid from the vessel to the lower part of the chamber when the apparatus is in its tilted service position, the said end of the supply duct being situated at the lowermost part of the chamber when the apparatus is in an upright out-of-service position so that the supply duct can also serve for conducting all residual liquid back from the chamber to the vessel when the apparatus is returned to an upright position.

4. Apparatus of the type specified for delivering measured quantities of liquid from a bottle or other vessel, comprising the combination of a measuring chamber having means for attaching it to the vessel, a plate bounding one side of the chamber and having an opening in the part which is lowermost when the apparatus is in a tilted service position for effecting a measuring operation, a syphon device arranged within the chamber, an air tube adapted to connect the syphon device with the vessel, a baffle arranged in the syphon device to form a weir in front of the entrance to the air tube, a supply duct communicating with the chamber through the said opening for conducting liquid from the vessel to the lower part of the chamber when the apparatus is in its tilted service position, and also for conducting all residual liquid back from the chamber to the vessel when the apparatus is returned to an upright position, and a weir plate situated in front of the said opening and wholly within the lower part of the chamber when the apparatus is in its tilted service position.

5. Apparatus as claimed in claim 1 and comprising the combination of a hollow body in which the measuring chamber is formed, the hollow body being provided with an air inlet, and a plate arranged in the hollow body and bounding the side of the chamber remote from the supply duct, the said plate forming with an adjacent wall of the hollow body a passage through which air can flow from the said inlet to the upper part of the chamber when the apparatus is in its tilted service position.

6. Apparatus as claimed in claim 1 and comprising the combination of a hollow body in which the measuring chamber and supply duct are formed, a pair of interconnected plates arranged in the hollow body and serving respectively to bound one side of the chamber and one side of the duct, and a weir plate situated in the chamber in front of the outlet to the duct and wholly within the lower part of the chamber when the apparatus is in its tilted service position.

7. Apparatus as claimed in claim 1 and comprising the combination of a hollow body in which the measuring chamber and supply duct are formed, the hollow body being provided with an air inlet, a plate arranged in the hollow body and bounding the side of the chamber remote from the supply duct, the said plate forming with an adjacent wall of the hollow body a passage through which air can flow from the said inlet to the upper part of the chamber when the apparatus is in its tilted service position, and a pair of interconnected plates also arranged in the hollow body and serving respectively to bound the other side of the said chamber and one side of the said duct.

8. Apparatus as claimed in claim 1 and comprising the combination with the plate bounding one side of the measuring chamber, of a tube connected to the opening in the plate and forming a part of the duct for conveying liquid to the chamber, and a weir plate situated in front of the said opening and wholly within the lower part of the chamber when the apparatus is in its tilted service position.

HAROLD GEORGE CONRADE.
LAWRENCE TEMPLE PAYNE.